United States Patent
Vaughn

(10) Patent No.: US 8,850,185 B1
(45) Date of Patent: *Sep. 30, 2014

(54) POST ATTACK MAN-IN-THE-MIDDLE DETECTION

(71) Applicant: Amazon Technologies, Inc., Seattle, WA (US)

(72) Inventor: Charles P. Vaughn, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/931,013

(22) Filed: Jun. 28, 2013

Related U.S. Application Data

(63) Continuation of application No. 12/980,674, filed on Dec. 29, 2010, now Pat. No. 8,484,460.

(51) Int. Cl.
  *H04L 29/06* (2006.01)
  *G06F 21/33* (2013.01)
  *H04L 9/32* (2006.01)

(52) U.S. Cl.
  CPC ............ *H04L 63/1466* (2013.01); *G06F 21/33* (2013.01); *H04L 9/3268* (2013.01)
  USPC ........... 713/155; 713/156; 713/157; 713/158; 726/27; 726/28; 726/29; 726/30

(58) Field of Classification Search
  CPC .... G06F 21/33; H04L 9/3268; H04L 63/0823
  USPC ....................................................... 713/155
  See application file for complete search history.

(56) References Cited

U.S. PATENT DOCUMENTS

| | | | |
|---|---|---|---|
| 6,807,577 B1 | 10/2004 | Gillespie et al. | |
| 8,112,624 B2 | 2/2012 | Parkinson et al. | |
| 2006/0294366 A1* | 12/2006 | Nadalin et al. | 713/156 |
| 2008/0126378 A1 | 5/2008 | Parkinson et al. | |
| 2010/0218243 A1 | 8/2010 | DeHaan et al. | |

OTHER PUBLICATIONS

Sotirov et al., "MD5 Considered Harmful Today: Creating a Rogue CA Certificate" Dec. 30, 2008, retrieved Dec. 23, 2010 from: http://www.win.tue.nl/hashclash/rogue-ca/ 25 pages.

"The EFF SSL Observatory", retrieved Dec. 29, 2010 from http://www.eff.org/observatory, 1 page.

U.S. Official Action dated Nov. 9, 2012 in U.S. Appl. No. 12/980,674, filed Dec. 29, 2010, First Named Inventor: Charles P. Vaughn.

U.S. Notice of Allowance/Allowability dated Mar. 19, 2013 in U.S. Appl. No. 12/980,674, filed Dec. 29, 2010, First Named Inventor: Charles P. Vaughn.

* cited by examiner

*Primary Examiner* — Longbit Chai
(74) *Attorney, Agent, or Firm* — Hope Baldauff, LLC

(57) ABSTRACT

Technologies are described herein for post attack man-in-the-middle detection. A first computer receives and stores public key certificates when connections are established. The first computer also uploads the stored public key certificates associated with a domain to a second computer each time a connection is established with the domain. The second computer receives the public key certificates from the first computer. The second computer then determines whether any of the public key certificates provided by the first computer are fraudulent certificates by comparing the received certificates to known valid certificates. If the second computer determines that the first computer has received one or more fraudulent certificates, the second computer may cause action to be taken with regard to the fraudulent certificates.

17 Claims, 6 Drawing Sheets

POST ATTACK MAN-IN-THE-MIDDLE DETECTION

CROSS-REFERENCE TO RELATED APPLICATIONS

This application is a continuation of U.S. patent application Ser. No. 12/980,674, entitled "POST ATTACK MAN-IN-THE-MIDDLE DETECTION" and filed on Dec. 29, 2010, now U.S. Pat. No. 8,484,460 dated Jul. 9, 2013, which is expressly incorporated herein by reference in its entirety.

BACKGROUND

A man-in-the-middle ("MITM") attack is a type of computer security breach in which an attacker makes independent connections with two victims and relays messages between them. The attacker in a MITM attack makes it appear to the victims of the attack that they are communicating directly with one another over a private connection. The attacker, however, controls the entire conversation.

In a transaction between a client and a server, for example, a MITM attacker can utilize various techniques to split a single connection between a client and a server into two separate connections: one connection between the client and the attacker and another connection between the server and the attacker. Once the connection has been split in this manner, the attacker can read and modify data transmitted between the client and server without being easily detected.

Public key certificates (which may be referred to herein as "digital certificates" or simply "certificates") are one mechanism utilized to prevent MITM attacks. A public key certificate is an electronic document issued by a trusted party, called a certification authority ("CA"), which can be utilized to verify that a public encryption key belongs to a company or individual. For example, a CA might issue a public key certificate to an e-commerce merchant. The public key certificate includes information about the merchant, the merchant's public encryption key, and is digitally signed by the CA using the CA's private encryption key.

When a client connects to a server operated by the e-commerce merchant, the server transmits the merchant's public key certificate to the client. The client then utilizes the certificate to verify that the merchant in fact operates the server and to obtain the merchant's public encryption key. A key exchange can then occur between the client and the server to create an encrypted two-way communications session.

Despite the trusted nature of the CAs, it is possible for an attacker to fraudulently obtain a valid public key certificate for a domain that the attacker does not own. An attacker can then utilize such a fraudulently obtained public key certificate to masquerade as the owner of the domain and to perform MITM attacks on victims connecting to the domain.

It is with respect to these and other considerations that the disclosure made herein is presented.

DETAILED DESCRIPTION

Figure 1:
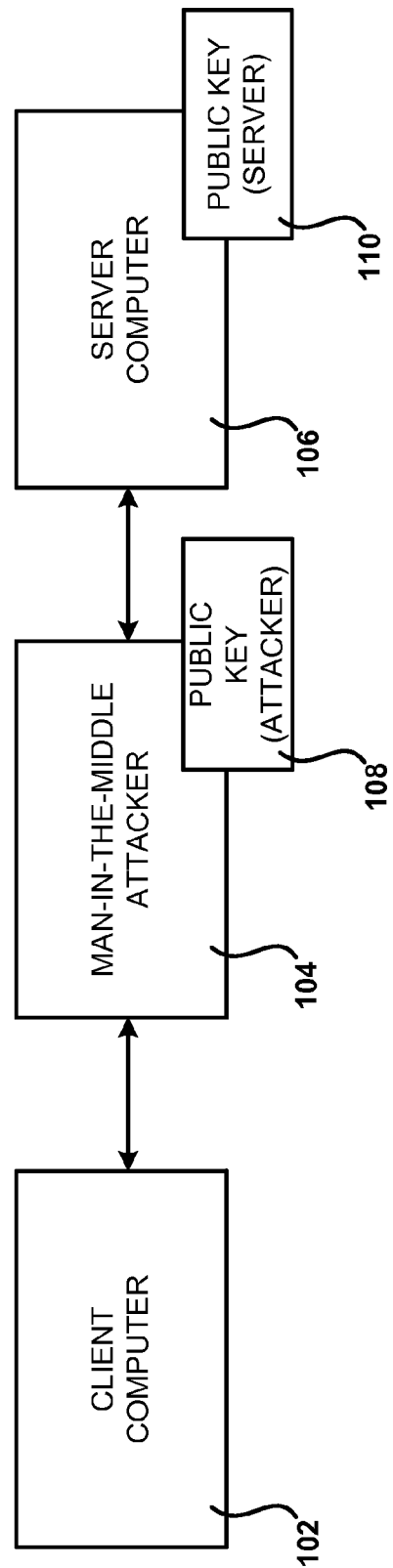
FIG. 1 is a block diagram illustrating aspects of a man-in-the-middle attack that might be detected utilizing an implementation of the concepts and technologies disclosed herein.

The following detailed description is directed to technologies for detecting MITM attacks. Utilizing the technologies described herein, valid but fraudulently obtained digital certificates utilized by a MITM attacker can be identified subsequent to a MITM attack by comparing received certificates to certificates known to be valid. Appropriate action can then be taken in response to detecting fraudulent certificates used in a MITM attack, such as notifying a victim of the attack, contacting a law enforcement agency, or taking other appropriate action.

According to one aspect disclosed herein, a first computer is configured to receive a public key certificate when a connection is established to another computer. For instance, in one embodiment a client computer has a World Wide Web ("Web") browser application configured to receive a public key certificate from a Web server computer when a connection is established. The public key certificates received by the first computer might be valid certificates received from a legitimate source or fraudulent certificates received from an attacker perpetrating a MITM attack. The first computer will be unable to distinguish between a valid public key certificate and fraudulent public key certificate utilized by a MITM attacker.

The first computer may also be configured to collect and store data regarding the origination of each public key certificate. For instance, the first computer might store data identifying a name of a network to which the computer is connected when each public key certificate is received, a media access control ("MAC") address associated with the network, a base station identifier ("BSID") of a wireless network to which the computer is connected when each certificate is received, and a geographical location of the computer when each public key certificate is received. The first computer might also collect and store other information regarding the origination of each received public key certificate. The first computer also stores each received public key certificate.

The first computer is also configured to upload the stored public key certificates associated with a domain to a second computer each time a connection is established. For instance, when a Web browser application executing on a client computer makes a connection to a Web server computer, the Web browser application might transmit each of the public key certificates associated with the domain of the Web server. In this manner, the Web server receives a complete collection of the public key certificates stored by the Web browser application for the domain, regardless of whether the public key certificates were validly received from the Web server or received from a MITM attacker. The Web browser might also transmit the data collected regarding the origination of each public key certificate.

A second computer is also disclosed herein that is configured to receive the public key certificates from the first computer. For instance, in one embodiment, a Web server is provided that is configured to expose a certificate validation application programming interface ("API"). The first computer can call the API to provide the public key certificates to the Web server computer. The second computer is also configured to store a copy of each public key certificate received from a CA in a certificate store. In this manner, the second computer maintains a record of the valid public key certificates it has received from CAs and utilized.

In response to receiving a call to the certificate validation API, the second computer is configured to determine whether any of the public key certificates provided by the first computer are fraudulent certificates. For instance, the second computer might compare the public key certificates received from the first computer to the stored certificates received from the CAs to determine whether any of the certificates received from the first computer are fraudulent. Fraudulent certificates may include a public encryption key associated with an attacker rather than a valid public encryption key associated with the second computer.

If the second computer determines that the first computer has received one or more fraudulent certificates, the second computer may take action with regard to the fraudulent certificates. For instance, the second computer might cause a user account to be reviewed for fraudulent activity, cause a notification to be transmitted to a user regarding the fraudulent certificates, or cause a notification to be transmitted to a law enforcement agency regarding the fraudulent certificates. Other types of actions might also be taken.

The data collected by the first computer might also be utilized when action is taken with regard to the fraudulent certificates. For instance, the name of the network that the first computer was connected to when a fraudulent certificate was received might be provided to a user of the first computer so that the user will avoid another connection to the identified network. The data collected by the first computer regarding the origination of the fraudulent certificates might also be utilized in other ways.

Additional details regarding the various processes briefly described above for detecting a MITM attack will be presented below with regard to FIGS. 1-6. It should be appreciated that although the embodiments disclosed herein are presented primarily in the context of a client and server architecture, the embodiments disclosed herein may be utilized to detect a MITM attack between any two computer systems configured in the manner described herein. Accordingly, the embodiments disclosed herein should not be limited to use within a client and server architecture or transaction.

It should also be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 is a block diagram illustrating aspects of a man-in-the-middle attack that might be detected utilizing an implementation of the concepts and technologies disclosed herein. As discussed briefly above, a MITM attack is a type of computer security breach in which an attacker makes independent connections with two victims and relays messages between them. The attacker in a MITM attack makes it appear to the victims of the attack that they are communicating directly with one another over a private connection. The attacker, however, controls the entire conversation.

In the example MITM attack shown in FIG. 1, an attacker 104 has compromised a transaction between a client computer 102 and a server computer 106. In this example, the attacker 104 has utilized one of many techniques known in the art to split a single connection between the client computer 102 and the server computer 106 into two separate connections: one connection between the client computer 102 and the attacker 104 and another connection between the server computer 106 and the attacker 104. Once the connection has been split in this manner, the attacker 104 can read and modify data transmitted between the client computer 102 and the server computer 104 without being easily detected.

In the MITM attack illustrated in FIG. 1, the attacker 104 masquerades as the server computer 106 when communicating with the client computer 102 and masquerades as the client computer 102 when communicating with the server computer 106. For instance, in a standard public encryption key exchange transaction, the client computer 102 will ask the server computer 106 for its public encryption key 110. In response to such a request, the server computer 106 will transmit its public encryption key 110 to the client computer 102. The attacker 104, however, will intercept this reply.

In response to the request by the client computer 102 for the public encryption key of the server computer 106, the attacker 104 will provide a forged response that includes the attacker's public encryption key 108. Consequently, subsequent messages generated by the client computer 102 will be encrypted utilizing the attacker's public encryption key 108. These messages will be intercepted by the attacker 104, decrypted using the attacker's private encryption key, potentially altered, and re-encrypted using the public encryption key 110 of the server computer 106. The server computer 106 will receive the messages and believe that the messages came from the client computer 102 since the messages were properly encrypted.

It should be appreciated that the MITM attack illustrated in FIG. 1 is merely illustrative and that other types of MITM attacks of greater sophistication might also be perpetrated by an attacker 104. These types of attacks are well known to those skilled in the art. As also discussed above, although FIG. 1 illustrates a MITM attack being perpetrated between a client computer 102 and a server computer 106, this type of attack might be perpetrated between any two computing systems, including peer computing systems and others.

Figure 2:
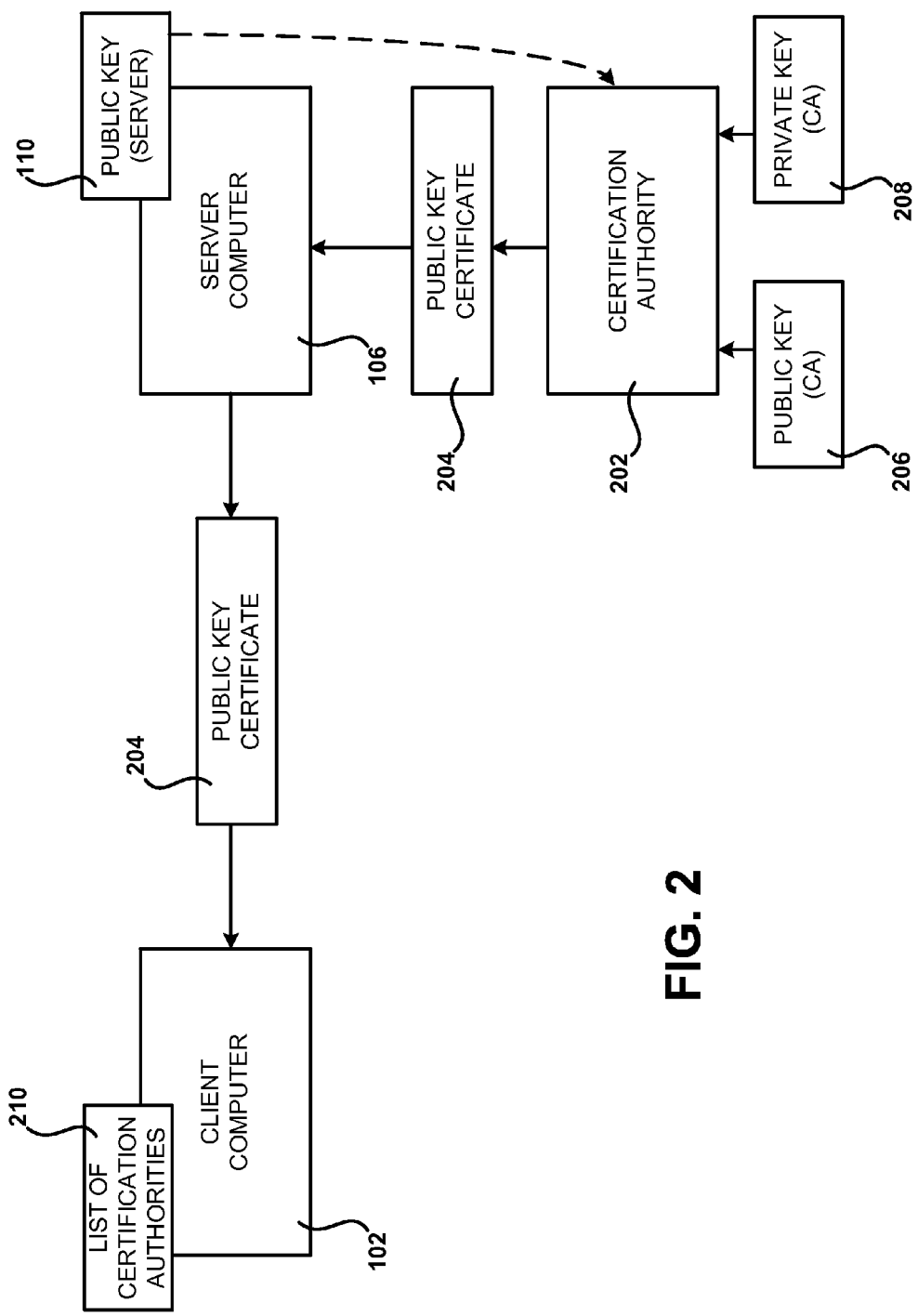
FIG. 2 is a block diagram illustrating aspects of a public key infrastructure that is utilized in embodiments disclosed herein for post attack man-in-the-middle detection.

As described briefly above, public key certificates are one mechanism utilized to prevent MITM attacks. FIG. 2 is a block diagram illustrating aspects of a public key infrastructure that provides support for the use of public key certificates and that is utilized in embodiments disclosed herein for post attack man-in-the-middle detection.

A public key certificate 204 is an electronic document issued by a trusted party, referred to herein as a certification authority 202, which can be utilized to verify that a public encryption key 110 belongs to a company or individual. For example, a CA 202 might issue a public key certificate 204 to an e-commerce merchant for use with a server computer 106. The public key certificate 204 includes information about the CA 202, about the merchant, the merchant's public encryption key 110, and potentially other information. The CA 202 signs the certificate 204 by creating a hash of the fields of the certificate 204 and encrypting the hash with the CAs private key 208. This data, referred to as a digest, is also placed into the certificate 204.

When a client computer 102 connects to the server computer 106 operated by the e-commerce merchant, the server computer transmits the merchant's public key certificate 204 to the client computer 102. The client computer 102 then utilizes the public key certificate 204 to verify that the merchant in fact operates the server computer 106 and to obtain the merchant's public encryption key 110. In particular, the client computer 102 utilizes the CA's public key 206 to decrypt the digest stored in the certificate 204. In this regard, a list of CAs 210 might be maintained at the client computer 210 that identifies popular CAs and their public encryption keys.

The client computer 102 also computes its own hash of the fields in the certificate 204. The integrity of the certificate 204 is validated if the hash value generated by the client computer 102 matches the digest generated by the CA 202 and stored in the certificate 204. In this case, the server computer 106 is presumed to be operated by the merchant to which the certificate 204 was assigned. Once this has occurred, a key exchange can then occur between the client computer 102 and the server computer 106 to create an encrypted two-way communications session. Other types of activities might also be performed once the certificate 204 has been verified.

It should be appreciated that the public key infrastructure illustrated in FIG. 2 and described above has been simplified. Other aspects of commonly utilized public key infrastructures will be apparent to those skilled in the art. It should also be appreciated that the embodiments disclosed herein might be utilized with public key infrastructures other than the one illustrated in FIG. 2 and described above.

Despite the trusted nature of the CA 202, it is possible for an attacker to fraudulently obtain a valid public key certificate for a domain that the attacker does not own (referred to herein as a "fraudulent certificate"). An attacker can utilize a fraudulent certificate to masquerade as the owner of the domain and to perform MITM attacks on victims connecting to the domain. The embodiments disclosed herein provide mechanisms for detecting such an attack after the attack has occurred. Once such an attack has been detected, actions can be taken to prevent further attacks from occurring using the same fraudulent certificate. Details regarding these processes are provided below with regard to FIGS. 3-6.

Figure 3:
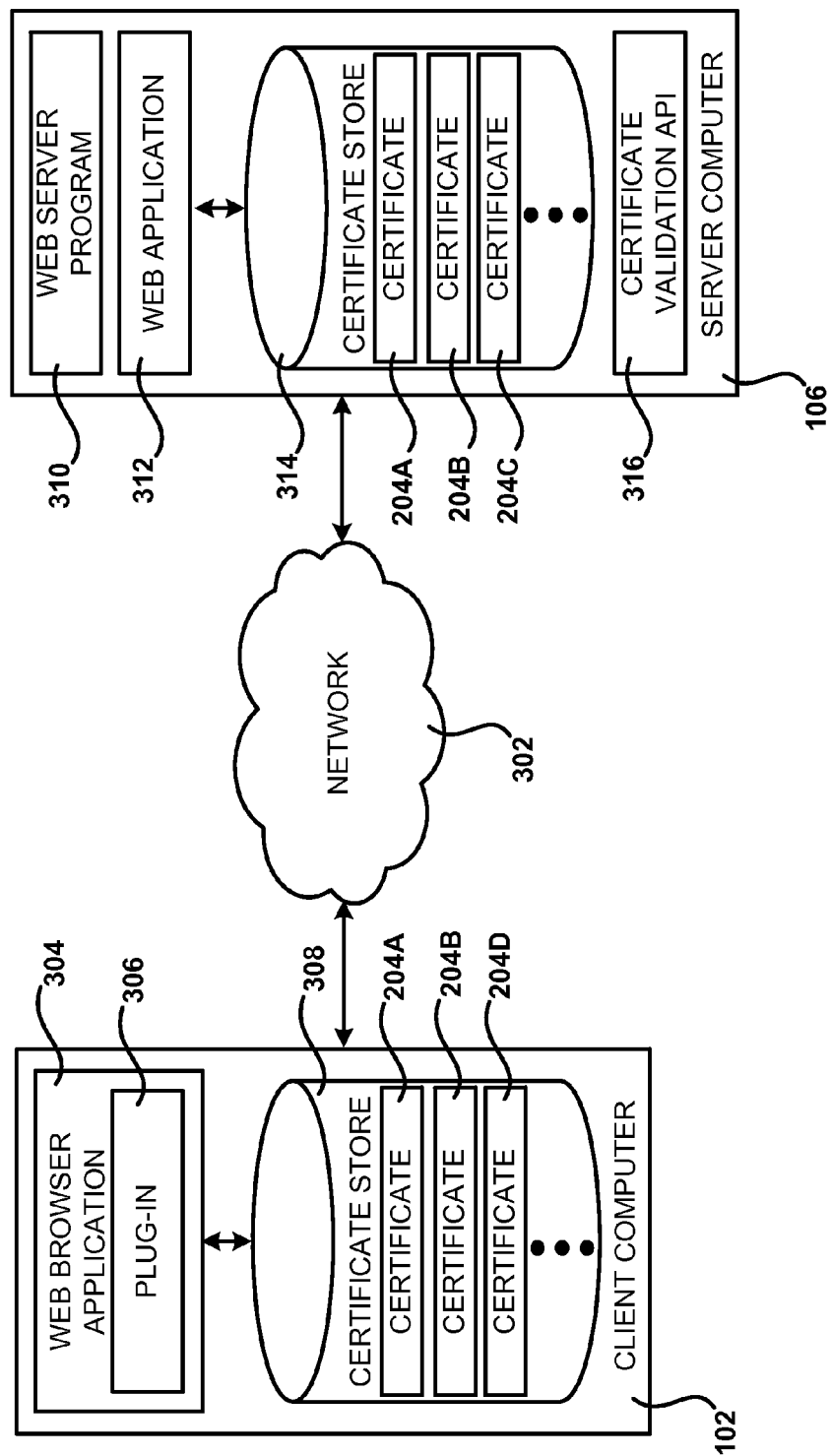
FIG. 3 is a computer network and architecture diagram showing aspects of a client computer and a server computer configured to detect a man-in-the-middle attack according to one embodiment disclosed herein.

FIG. 3 is a computer network and architecture diagram showing aspects of a client computer 102 and a server computer 106 configured to detect a MITM attack according to one embodiment disclosed herein. In the example operating environment shown in FIG. 3, a client computer 102 is configured with a Web browser application 304. The Web browser application 304 might be the INTERNET EXPLORER Web browser application from MICROSOFT CORPORATION, the CHROME Web browser application from GOOGLE, INC., the SAFARI Web browser application from APPLE, INC., the FIREFOX Web browser application from the MOZILLA CORPORATION, or another Web browser application from another developer. Details regarding the typical operation of a Web browser application for receiving and rendering Web pages are known to those skilled in the art.

As illustrated in FIG. 3, the Web browser application 306 might be configured to execute a plug-in 306. As known in the art, the plug-in 306 is an add-on program that extends the functionality of the Web browser application 306. The functionality described herein as being performed at the client computer 102 might be performed by the Web browser application 304, the plug-in 306, or by a combination of the two. This functionality might also be integrated within an operating system of the client computer 102 or performed by another type of application or component, or combination of applications or components, executing on the client computer 102. In this regard, it should be appreciated that the embodiment disclosed with regard to FIG. 3 and described herein is merely illustrative.

The Web browser application 304 shown in FIG. 3 may receive public key certificates 204A, 204B, and 204D such as, for instance, in response to connecting to a Web application 312. As discussed above, the client computer 102 may utilize the received certificates 204 to verify the identity of the operator of the server computer 106 and to obtain a public encryption key for the server computer 106. The certificates 204 might also be utilized for other purposes known to those skilled in the art.

According to embodiments disclosed herein, the Web browser application 304 is also configured to store certificates 204A, 204B, and 204D received from each domain in a certificate store 308. In the example shown in FIG. 3, the client computer 102 has stored the certificates 204A, 204B, and 204D in the certificate store 308. The certificate store 308 might be a database, a location on a file system of the client computer 102, a network share, or another type of location capable of storing electronic documents. As mentioned above, the certificates 204 stored in the certificate store 308 might be valid certificates received from a legitimate operator of a server computer 106 or fraudulent certificates received from a MITM attacker. The client computer 102 cannot distinguish between valid and fraudulent certificates.

The client computer 102 is also configured to transmit the certificates 204 stored in the certificate store 308 when a connection is established to a remote computer. For instance, in one embodiment, the Web browser application 304 is configured to identify the certificates 204 in the certificate store 308 pertaining to a domain and to transmit the identified certificates 204 to a computer on the domain when the connection is established. In the example shown in FIG. 3, the Web browser application 304 transmits the certificates 204 stored in the certificate store 308 pertaining to the domain on which server computer 106 is operating. As will be described in greater detail below, the server computer 106 exposes a certificate validation API 106 for receiving the certificates 204.

The client computer 102 is also configured in one embodiment to collect and store data regarding the origination of each public key certificate 204 received at the client computer 102. For instance, the client computer 102 might store data identifying a name of a network to which the client computer 102 is connected when each public key certificate 204 is received. Similarly, the client computer 102 might store a media access control ("MAC") address associated with the network to which the client computer 102 is connected, such as the MAC address of a connected router, when each public key certificate 204 is received.

In other embodiments, the client computer 102 stores its own geographical location at the time each public key certificate 204 is received. In this regard, the client computer 102 might be equipped with appropriate hardware or software for determining its own geographical location. It should be appreciated that the client computer 102 might also collect and store other information regarding the origination of each received public key certificate 204. This information might be stored in the certificate store 308 or in another location. As will be described below, this information might also be transmitted to the server computer 106 and utilized to take action regarding fraudulent certificates.

As shown in FIG. 3, a server computer 106 is also provided in embodiments that is configured to communicate with the client computer 102 by way of a network 302. In one embodiment, the server computer 106 is a server computer configured to execute a Web server program 310 for providing a Web application 312 to the client computer 102. For instance, the Web application 312 might be an e-commerce Web application accessible to the client computer 102 by way of the Web browser application 304. It should be appreciated that the server computer 106 might also be another type of computing system configured to provide another type of application or applications.

As illustrated in FIG. 3, the server computer 106 is also configured to maintain a certificate store 314. The certificates 204A-204C stored in the certificate store 314 are valid certificates that have been generated by the CA 202 and distributed by the server computer 106. The server computer 106 stores the certificates 204 generated by the CA 202 each time a new certificate 202 is received. In this way, the server computer 106 maintains a record of the valid certificates issued by the CA on its behalf and distributed by the server computer 106. As will be discussed in greater detail below, the server computer 106 utilizes the certificates 204A-204C stored in the certificate store 314 to identify whether any of the certificates 204A, 204B, and 204D, received from the client computer 102 are fraudulent certificates.

As also illustrated in FIG. 3, the server computer 106 is configured in one embodiment to expose a certificate validation API 316. The certificate validation API 316 may be called by the client computer 102 in order to validate the certificates 204A, 204B, and 204D, stored in the certificate store 308. The certificate validation API 316 might be implemented as a Web services API or another type of API accessible to the client computer 102. As discussed above, the Web browser application 304 executing on the client computer 102 is configured to identify the certificates 204 in the certificate store 308 that pertain to a domain associated with the server computer 106 and to transmit the certificates 204 to the server computer 106 when a connection is established.

When the certificate validation API 316 receives a call from the client computer 106 and a number of certificates 204A, 204B, and 204D, the certificate validation API 316 causes the server computer 106 to determine whether any of the certificates received from the client computer 102 are fraudulent certificates. For instance, in one embodiment, the server computer 106 compares the certificates received from the client computer 102 to the certificates stored in the certificate store 314 to determine the authenticity of the received certificates. In the example shown in FIG. 3, the certificates 204A and 204B are stored in the certificate store 314. The certificate 204D is, however, not stored in the certificate store 314. Consequently, the server computer 106 might conclude that the certificate 204D is a fraudulent certificate.

If the server computer 106 identifies any fraudulent certificates, the server computer 106 might cause appropriate action to be taken with respect to the fraudulent certificates. For instance, according to embodiments, the server computer 106 might cause a notification to be transmitted to a user of the client computer 102. The server computer 106 might also cause a user account to be reviewed for fraudulent activity. In other scenarios, the server computer 106 might cause a notification to be transmitted to a law enforcement agency regarding the fraudulent certificates. The server computer 106 might also cause an inquiry to be generated with the CA 202 that generated the fraudulent certificates in order to determine how the certificates came into existence.

It should be appreciated that the type and number of actions taken in response to detecting fraudulent certificates might vary based upon the type of entity that operates the server computer 106. For instance, a bank might take immediate action to warn a user of the client computer 102 of the attack. Other types of entities might wait longer periods of time before notifying a user or taking other action. For instance, some types of entities might configure the server computer 106 to wait until a threshold number of fraudulent certificates have been detected before notifying a user of the client computer 102 or taking other types of action.

Although not illustrated in FIG. 3, the server computer 106 might also be connected to other computer systems that are utilized to take action regarding fraudulent certificates. For instance, the server computer 106 might be connected to a customer service computer system for analyzing a customer account for signs of fraudulent activity. Similarly, the server computer 106 might be connected to a computer system operated by a law enforcement agency for handling reports of fraudulent certificates.

Prior to concluding that the client computer 102 has received fraudulent certificates, the server computer 106 might also cause a check to be made to determine that certificates have not improperly been identified as fraudulent certificates. For instance, the server computer 106 might perform one or more checks to ensure that suspected certificates are not actually valid certificates received from the CA 202 that were not properly stored in the certificate store 314, certificates used for testing, or other types of valid certificates.

As discussed briefly above, the client computer 102 might collect data regarding the origination of the certificates stored in the certificate store 308. The client computer 102 might transmit this data to the server computer 106 at the time the certificates are uploaded or at another time. For instance, the client computer 102 might transmit the data regarding the origination of the certificates 204 to the server computer 106 after fraudulent certificates have been detected. The data regarding the origination of the certificates may be transmitted to the server computer 106 by way of the certification validation API 316 or using another mechanism.

In other implementations, the client computer 102 does not upload the data regarding the origination of the certificates to the server computer 106. In this implementation, the Web browser application 304 or another component executing on the client computer 102 might display the data regarding the origination of the certificates to a user of the client computer 102 so that the user can take appropriate action. For instance, the Web browser application 304 might display the name of a network to which the client computer 102 was connected when a fraudulent certificate was received. A user of the client computer 102 can utilize this information to avoid another connection to the identified network. The server computer 106 might instruct the Web browser application 304 to display the data to a user of the client computer 102.

In other embodiments, the server computer 106 utilizes the data regarding the origination of the certificates when taking action on fraudulent certificates in other ways. For instance, the network name, MAC address, and geographic location of the client computer 102 when the fraudulent certificates were received might be transmitted to a law enforcement agency in order to aid in an investigation of the fraudulent certificates.

It should be appreciated that while a single client computer 102 and server computer 106 have been illustrated in FIG. 3, many client computers 102 and server computers 106 might be utilized in the manner disclosed herein. Moreover, although a single network 302 has been illustrated in FIG. 3, many networks might be utilized in order to establish a connection between the client computer 102 and the server computer 106.

Figure 4:
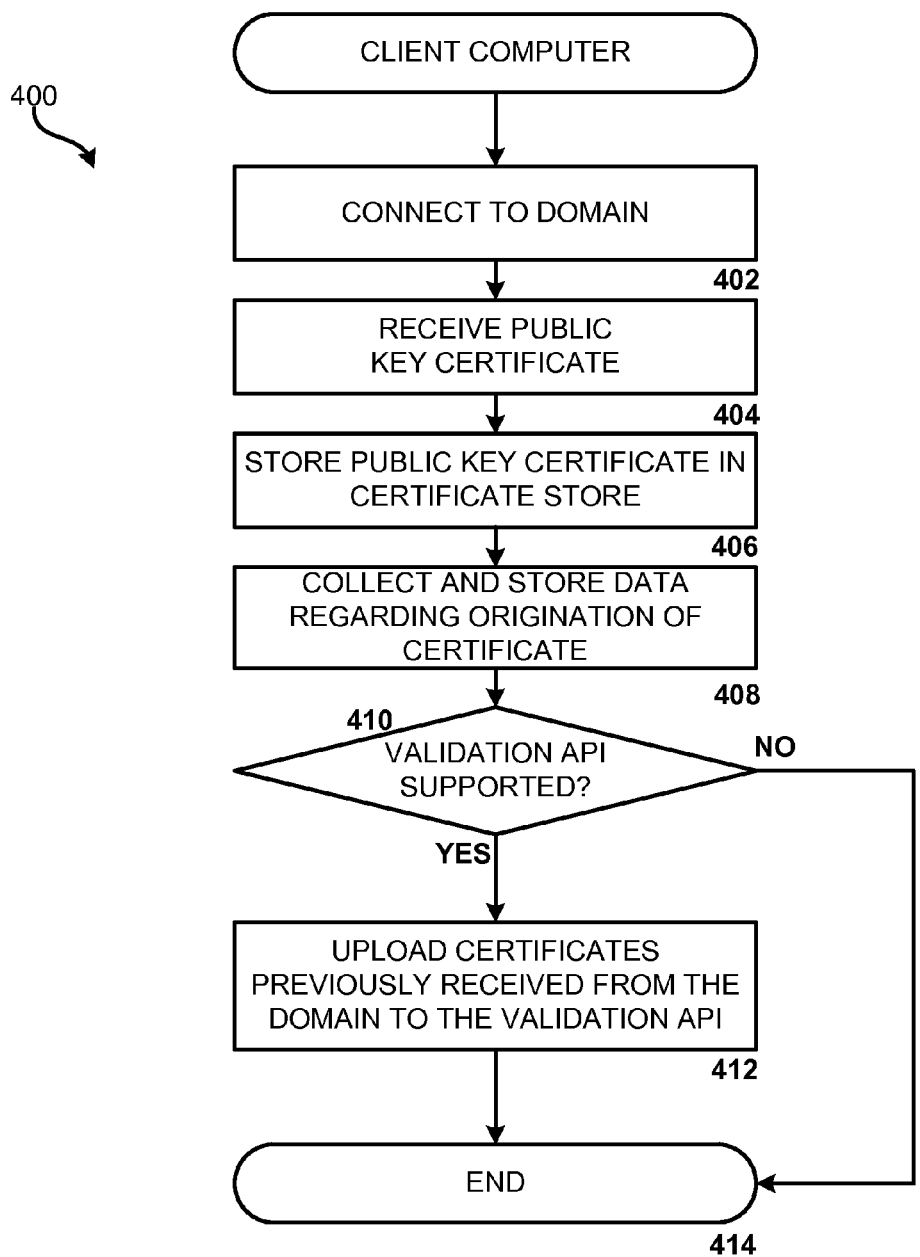
FIG. 4 is a flow diagram showing a routine that illustrates the operation of a client computer for detecting a man-in-the-middle attack in one embodiment disclosed herein.

Referring now to FIG. 4, additional details will be provided regarding one illustrative process disclosed herein for post attack MITM detection. It should be appreciated that the logical operations described herein with respect to FIG. 4 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 is a flow diagram showing a routine 400 that illustrates aspects of the operation of the client computer 102 for detecting a MITM attack in one embodiment disclosed herein. In one embodiment, the routine 400 is performed by the Web browser application 304. It will be appreciated that the routine 400 may also be performed by another module or component, such as the plug-in 306, or by a combination of modules and components.

The routine 400 begins at operation 402, where the client computer 102 connects to a domain, such as a Web application 312 provided by the server computer 106. During the process of connecting to the Web application 312, the server computer 102 transmits a public key certificate 204 to the client computer 102. The client computer receives the public key certificate 204 at operation 404.

At operation 406, the client computer 102 stores the received public key certificate 204 in the certificate store 308 in the manner described above. In this manner, the client computer 102 receives public key certificates 204 associated with various domains, Web sites, server computers, and other entities, and stores the received certificates in the certificate store 308. The stored certificates may be valid certificates or fraudulent certificates.

From operation 406, the routine 400 proceeds to operation 408, where the client computer 102 collects and stores data regarding the origination of the certificate received at operation 404. As discussed above, for instance, the client computer 102 might collect data identifying a name of a network to which the client computer 102 is connected when the public key certificate is received, a MAC address associated with the network, a base station identifier ("BSID"), a geographical location of the client computer 102 when the public key certificate is received and potentially other information regarding the origination of the received public key certificate. This data might be stored in the certificate store 308 or in another location.

From operation 408, the routine 400 proceeds to operation 410, where the client computer 102 determines whether the server computer 106 supports the certification validation API 316. If the server computer 106 supports the certification validation API 316, the routine 400 proceeds from operation 410 to operation 412 where the client computer 102 identifies the certificates 204 stored in the certificate store 308 that are associated with the domain on which the server computer 102 is operating. The client computer 102 then transmits the identified certificates to the server computer 106 by way of the certificate validation API 316.

According to embodiments, the client computer 106 might transmit only those certificates received during a specified time period (e.g. the previous year or month) to the server computer 106. In this manner, the number of certificates transmitted from the client computer 102 to the server computer 106 may be limited. The client computer 102 might also transmit the collected data regarding the origination of the certificates to the server computer 106 at operation 412. Alternatively, the client computer 102 might transmit this data to the server computer 106 at a later time or not at all, as discussed above. From operation 412, the routine 400 proceeds to operation 414, where it ends.

Figure 5:
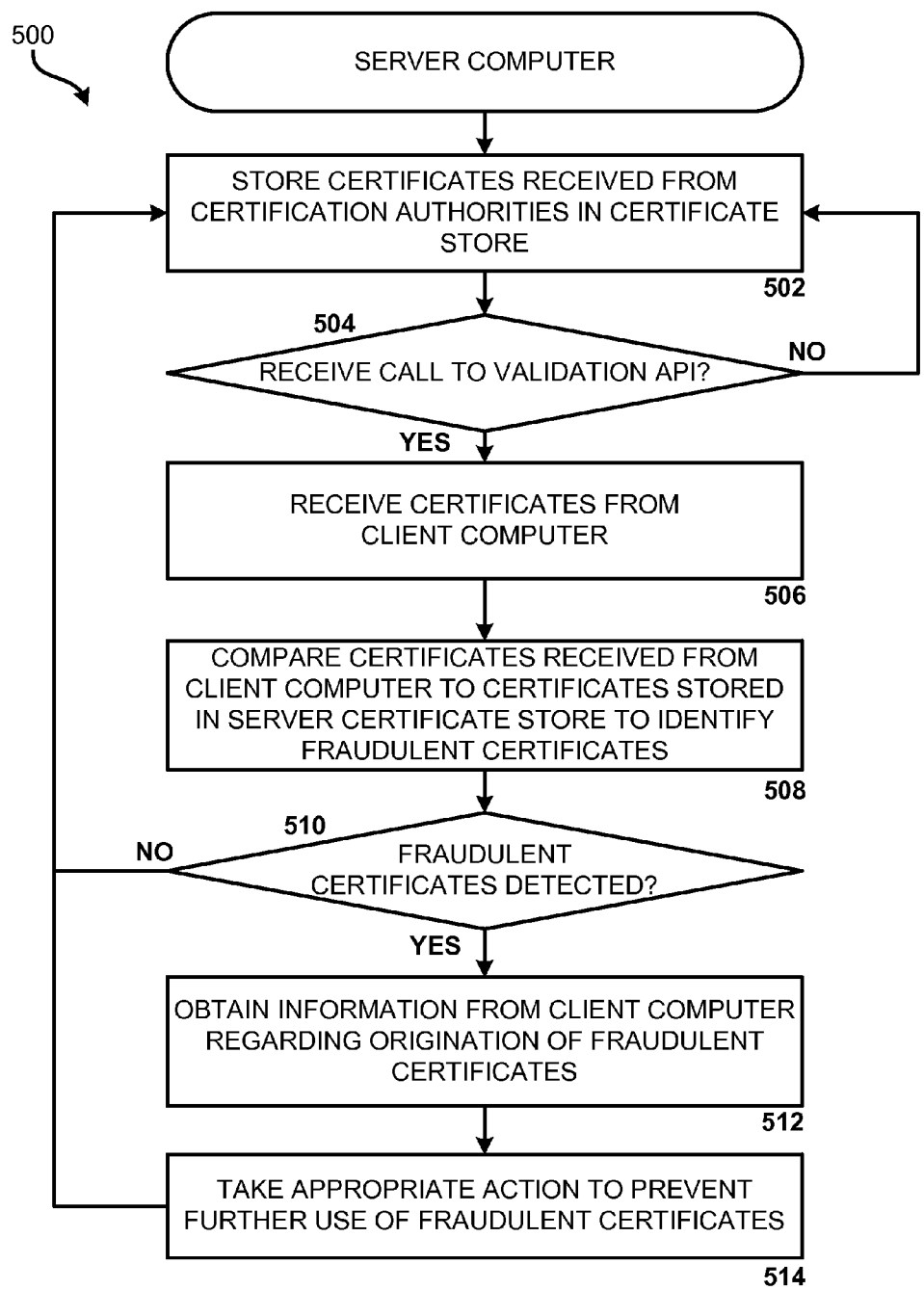
FIG. 5 is a flow diagram showing a routine that illustrates the operation of a server computer for detecting a man-in-the-middle attack in one embodiment disclosed herein.

FIG. 5 is a flow diagram showing a routine 500 that illustrates aspects of the operation of the server computer 106 for detecting a MITM attack in one embodiment disclosed herein. In one embodiment, the Web server program 310 performs the routine 500. The routine 500 might also be performed by the Web application 312, another application or component executing on the server computer 106, or another application, component, or combination of applications or components executing on a different computer system. The routine 500 might also be performed by a combination of modules and components implemented in software, hardware, or a combination of both.

The routine 500 begins at operation 502, where the server computer 106 stores public key certificates 204 received from the CA 202, and other CAs, in the certificate store 314. It should be appreciated that an operator of the server computer 106 might obtain new certificates each year or other time period to replace expired certificates. The operator might also obtain new certificates 204 from other CAs periodically to take advantage of better pricing or new certificate features. The certificates 204 are stored in the certificate store 314 each time new certificates are distributed by the server computer 106.

From operation 502, the routine 500 proceeds to operation 504, where the server computer 106 determines whether a call has been made to the certificate validation API 316. If not, the routine 500 proceeds back to operation 502, described above. If a call has been made to the certificate validation API 316, the routine 500 proceeds to operation 506 where the server computer 106 receives the certificates 204 to be verified from the client computer 102. As discussed above, the server computer 106 might also receive data from the client computer 102 regarding the origination of the certificates.

From operation 506, the routine 500 proceeds to operation 508, where the server computer 106 determines whether any of the public key certificates 204 received from the client computer 102 are fraudulent certificates. As discussed above, the server computer 106 might make this determination by comparing the certificates received from the client computer 102 to the certificates stored in the certificate store 314. If no fraudulent certificates are detected, the routine 500 proceeds from operation 510 to operation 502, described above.

If the server computer 106 identifies fraudulent certificates, the routine 500 proceeds from operation 510 to operation 512. At operation 512, the server computer 106 obtains the data from the client computer 102 regarding the origination of the fraudulent certificates. As discussed above, this data might be obtained from the client computer 102 at the time a call is made to the certification validation API 316, at the time fraudulent certificates are detected, or not at all.

From operation 512, the routine 500 proceeds to operation 514, where the server computer 106 takes appropriate action with regard to the fraudulent certificates. As discussed above, the server computer 106 might cause a user account to be reviewed for fraudulent activity, cause a notification to be transmitted to a user of the client computer 102 regarding the fraudulent certificates, cause a notification to be transmitted to a law enforcement agency regarding the fraudulent certificates, or cause a notification to be transmitted to the CAs 202 that issued the fraudulent certificates. Other types of actions might also be taken.

The server computer 106 might also utilize the data collected by the client computer 102 regarding the origination of the fraudulent certificates when action is taken with regard to the fraudulent certificates. For instance, the name of the network that the client computer 102 was connected to when a fraudulent certificate was received might be provided to a user of the client computer 102 so that the user will avoid another connection to the identified network. This information might also be provided to a law enforcement agency or a CA 202. The server computer 106 might also utilize the data collected by the client computer 102 regarding the origination of the fraudulent certificates in other ways. From operation 514, the routine 500 proceeds to operation 502, where the operations described above may be repeated.

It should be appreciated that when a MITM attack is occurring, the MITM attacker 104 may block the transmission of the certificates 204 from the client computer 102 to the server computer 106. However, the certificates 204 stored in the certificate store 308 will be transmitted to the server computer 106 the next time the client computer 102 connects to the server 106 on a network connection not compromised by the attacker 104.

Less sophisticated attackers might not block the transmission of the certificates 204 from the client computer 102 to the server computer 106. In this case, the server computer 106 might provide a notification to a user of the client computer 102 while the actual MITM attack is taking place. The notification might indicate to the user that they are the subject of a MITM attack and suggest that the user take appropriate action, such as establishing a connection to the server computer 106 by way of a different network connection. Other types of notifications might also be provided to the user of the client computer 102.

Figure 6:
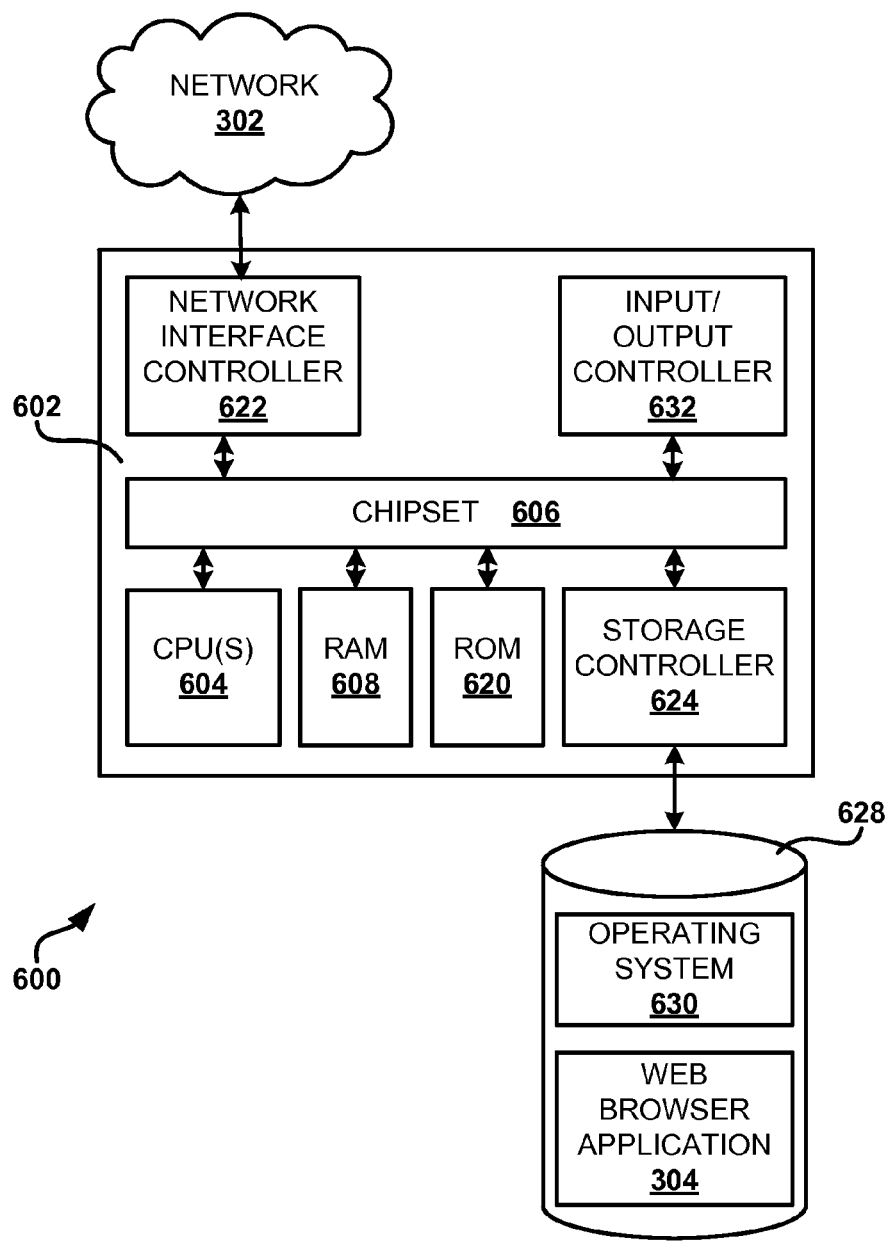
FIG. 6 is a computer architecture diagram showing an illustrative computer hardware architecture for implementing the various computing devices described in embodiments presented herein.

FIG. 6 shows an example computer architecture for a computer 600 capable of executing the software components described above. The computer architecture shown in FIG. 6 illustrates a conventional server computer, workstation, desktop computer, laptop, network appliance, personal digital assistant ("PDA"), e-reader, digital cellular phone, or other computing device, and may be utilized to execute any aspects of the software components presented herein described as executing on the client computer 102, the server computer 106, or on any other computing system mentioned herein.

The computer 600 includes a baseboard, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 are standard programmable processors that perform arithmetic and logical operations necessary for the operation of the computer 600.

The CPUs 604 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard. The chipset 606 may provide an interface to a random access memory ("RAM") 608, used as the main memory in the computer 600. The chipset 606 may further provide an interface to a computer-readable storage medium such as a read-only memory ("ROM") 620 or non-volatile RAM ("NVRAM") for storing basic routines that that help to startup the computer 600 and to transfer information between the various components and devices. The ROM 620 or NVRAM may also store other software components necessary for the operation of the computer 600 in accordance with the embodiments described herein.

The computer 600 may operate in a networked environment using logical connections to remote computing devices and computer systems through the network 206. The chipset 606 may include functionality for providing network connectivity through a network interface controller ("NIC") 622, such as a gigabit Ethernet adapter. The NIC 622 is capable of connecting the computer 600 to other computing devices over the network 206. It should be appreciated that multiple NICs 622 may be present in the computer 600, connecting the computer to other types of networks and remote computer systems.

The computer 600 may be connected to a mass storage device 628 that provides non-volatile storage for the computer. The mass storage device 628 may store system programs, application programs, other program modules, and data, which have been described in greater detail herein. The mass storage device 628 may be connected to the computer 600 through a storage controller 624 connected to the chipset 606. The mass storage device 628 may consist of one or more physical storage units. The storage controller 624 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 may store data on the mass storage device 628 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 628 is characterized as primary or secondary storage, and the like.

For example, the computer 600 may store information to the mass storage device 628 by issuing instructions through the storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 628 by detecting the physical states or characteristics of one or more particular locations within the physical storage units.

In addition to the mass storage device 628 described above, the computer 600 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 600.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 628 may store an operating system 630 utilized to control the operation of the computer 600. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 628 may store other system or application programs and data utilized by the computer 600, such as the Web browser application 304, the plug-in 306, the Web application 312, the certificates 204, and the certification validation API 316, each of which was described above.

In one embodiment, the mass storage device 628 or other computer-readable storage media is encoded with computer-executable instructions which, when loaded into the computer 600, transforms the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the routines 400 and 500, described with regard to FIGS. 4 and 5, respectively.

The computer 600 may also include an input/output controller 632 for receiving and processing input from a number of input devices, such as a keyboard, a mouse, a touchpad, a touch screen, an electronic stylus, or other type of input device. Similarly, the input/output controller 632 may provide output to a display, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for post attack MITM detection have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer executable instructions stored thereupon which, when executed by a client computer, will cause the computer to:

receive, through a Web browser application executing on the client computer, a plurality of public key certificates for a plurality of domains;

cause the plurality of public key certificates to be stored in a certificate store by the Web browser application; and transmit, through the Web browser application, at least one of the plurality of public key certificates to a server computer when a connection is established with the server computer so as to enable the server computer to compare valid public key certificates received from one or more certification authorities to the at least one public key certificate received from the client computer to determine if the at least one public key certificate received from the client computer is fraudulent.

2. The computer-readable storage medium of claim 1, wherein the at least one of the plurality of public key certificates that is transmitted to the server comprises at least one of the plurality of public key certificates that is associated with a domain of the server computer.

3. The computer-readable storage medium of claim 1, having further computer executable instructions stored thereupon which, when executed by the computer, cause the computer to collect and store data regarding an origination of the plurality of public key certificates received from the plurality of domains.

4. The computer-readable storage medium of claim 3, wherein the data regarding the origination of the plurality of public key certificates comprises a name of a network that the computer was connected to when each of the plurality of public key certificates was received.

5. The computer-readable storage medium of claim 3, wherein the data regarding the origination of the plurality of public key certificates comprises a media access control (MAC) address associated with a network that the computer was connected to when each of the plurality of public key certificates was received.

6. The computer-readable storage medium of claim 3, wherein the data regarding the origination of the plurality of public key certificates comprises a geographic location of the computer when each of the plurality of public key certificates was received.

7. The computer-readable storage medium of claim 3, having further computer executable instructions stored thereupon which, when executed by the computer, cause the computer to transmit the data regarding the origination of the plurality of public key certificates to the server computer.

8. A computer-implemented method comprising performing computer operations for:
  receiving, by a client computer, a plurality of public key certificates for a plurality of domains; and
  transmitting at least one public key certificate of the plurality of public key certificates from the client computer to a server computer when a connection is established with the server computer so as to enable the server computer to compare public key certificates received from a certification authority to the at least one public key certificate of the plurality of public key certificates received from the client computer to determine if at least one of the at least one public key certificate received from the client computer is fraudulent.

9. The computer-implemented method of claim 8, further comprising storing the plurality of public key certificates in a certificate store prior to transmitting the at least one public key certificate of the plurality of public key certificates to the server computer.

10. The computer-implemented method of claim 8, wherein the at least one public key certificate of the plurality of public key certificates that is transmitted to the server computer comprises at least one public key certificate of the plurality of public key certificates that is associated with a domain of the server computer.

11. The computer-implemented method of claim 8, wherein the receiving and transmitting operations are performed by a Web browser application.

12. The computer-implemented method of claim 8, further comprising:
  collecting data regarding an origination of the plurality of public key certificates received from the plurality of domains; and
  transmitting the data regarding the origination of the plurality of public key certificates to the server computer.

13. The computer-implemented method of claim 12, wherein the data regarding the origination of the plurality of public key certificates comprises one or more of a name of a network from which each of the plurality of public key certificates was received, a media access control (MAC) address, and a geographic location of the client computer at a time each of the plurality of public key certificates was received.

14. An apparatus, comprising:
  a hardware processor; and
  a non-transitory computer readable storage medium having computer-executable instructions stored thereupon which, when executed by the processor, cause the apparatus to receive, as a client computing device, a plurality of public key certificates for a plurality of domains, and transmit at least one public key certificate of the plurality of public key certificates to a server computer when a connection is established with the server computer so as to enable the server computer to compare public key certificates received from a certification authority to the at least one public key certificate transmitted by the apparatus to determine if the transmitted at least one public key certificate is fraudulent.

15. The apparatus of claim 14, wherein the computer readable storage medium has a Web browser application stored thereupon, and wherein the Web browser application is configured to performing the receiving and transmitting operations.

16. The apparatus of claim 14, wherein the computer readable storage medium has further computer-executable instructions stored thereupon which, when executed by the processor, cause the apparatus to:
  collect data regarding an origination of the plurality of public key certificates received from the plurality of domains; and
  transmit the data regarding the origination of the plurality of public key certificates to the server computer.

17. The apparatus of claim 16, wherein the data regarding the origination of the at least one public key certificate comprises one or more of a name of a network, a media access control (MAC) address, a base station identifier (BSID) of a wireless base station, and a geographic location of the apparatus when the at least one public key certificate was received at the client computer.

* * * * *